(12) United States Patent
Brant (10) Patent No.: US 6,916,882 B2
(45) Date of Patent: *Jul. 12, 2005

(54) PLASTICIZED POLYPROPYLENE THERMOPLASTICS

(75) Inventor: Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 244 days.

This patent is subject to a terminal disclaimer.

(21) Appl. No.: 10/259,680

(22) Filed: Sep. 27, 2002

(65) Prior Publication Data

US 2003/0130422 A1 Jul. 10, 2003

Related U.S. Application Data

(63) Continuation of application No. 09/390,235, filed on Sep. 3, 1999, now Pat. No. 6,639,020.

(51) Int. Cl.$^7$ .............................. C08F 8/00; C08L 9/00; C08L 23/00; C08L 23/04
(52) U.S. Cl. ..................... 525/191; 525/232; 525/240
(58) Field of Search ................................ 525/191, 232, 525/240

(56) References Cited

U.S. PATENT DOCUMENTS

| | | | |
|---|---|---|---|
| 3,178,386 A | | 4/1965 | Hickman |
| 3,201,364 A | | 8/1965 | Salyer |
| 3,281,390 A | | 10/1966 | O'Leary, Jr. |
| 4,668,834 A | | 5/1987 | Rim et al. .................. 585/12 |
| 4,704,491 A | | 11/1987 | Tsutsui et al. ............... 585/10 |
| 4,749,739 A | | 6/1988 | Foster et al. ................ 524/271 |
| 4,914,253 A | | 4/1990 | Chang ........................ 585/523 |
| 5,213,744 A | | 5/1993 | Bossaert .................... 264/271 |
| 5,290,886 A | | 3/1994 | Ellul ........................... 524/515 |
| 5,317,070 A | | 5/1994 | Brant et al. ............... 526/348.5 |
| 5,468,807 A | * | 11/1995 | Tsurutani et al. ............ 525/240 |
| 5,571,864 A | | 11/1996 | Bates et al. ................... 525/88 |
| 5,654,364 A | | 8/1997 | Bates et al. ................... 525/98 |
| 5,675,049 A | | 10/1997 | Vermeiren et al. .......... 585/511 |
| 5,710,219 A | | 1/1998 | Bates et al. ................. 525/240 |
| 5,723,546 A | | 3/1998 | Sustic ......................... 525/240 |
| 5,763,534 A | * | 6/1998 | Srinivasan et al. ......... 525/240 |
| 5,866,665 A | | 2/1999 | Shaffer et al. ............ 526/348.4 |
| 6,187,869 B1 | * | 2/2001 | Gahleitner et al. ......... 525/232 |
| 6,639,020 B1 | * | 10/2003 | Brant .......................... 525/240 |

FOREIGN PATENT DOCUMENTS

| | | | |
|---|---|---|---|
| DE | 4404082 | | 2/1994 |
| EP | 0814127 A1 | * 12/1997 | ........... C08L/23/10 |
| EP | 0 814 127 A | 12/1997 | ........... C08L/23/60 |
| JP | 3057615 A | 8/1986 | |
| WO | WO 93/06169 | 4/1993 | ........... C08L/23/12 |
| WO | WO 94/12568 | 6/1994 | ........... C08L/23/08 |
| WO | WO 97/26287 | 7/1997 | ......... C08F/210/02 |
| WO | WO-01/18109 A1 | * 3/2001 | ........... C08L/23/10 |

OTHER PUBLICATIONS

"Pure Component Properties and Mixing Behavior in Polyolefin Blends", Krishnamoorti, et al, Macromolecules, vol. 29, pp. 367–376, (1996).

"Phase Behavior of Isotactic Polypropylene—Poly(ethylene/ethylethylene) Random Copolymer Blends", Weimann, et al, Macromolecules, vol. 30, pp. 3650–3657, (1997).

"Anomalous Attractive Interactions in Polypropylene Blends", Reichart, et al, Macromolecules, vol. 30, pp. 3036–3041, (1997).

"Regular and Irregular Mixing in Blends of Saturated Hydrocarbon Polymers", Graessley, et al, Macromolecules, vol. 28, pp. 1260–1270, (1995).

"Influence of Nematic Fluctuations on the Phase Separation of Polymer Blends", Liu, et al, Macromolecules, vol. 25, pp. 5551–5553,(1992).

"Novel low temperature resistant thermoplastic eleastomers for speciality applications", Ellul, Plastics, Rubber and Composites Processing and Applications, vol. 26, pp. 137–142, (1997).

"Plasticizers", Darby, et al, Encyclopedia of Polymer Science and Engineering, Supplemental vol., pp. 568–641.

* cited by examiner

*Primary Examiner*—Nathan M. Nutter (57) ABSTRACT

The invention is directed to a plasticized polypropylene thermoplastic composition comprising a blend of A) from 50 to 99.9 wt % of a thermoplastic polymer derived from polypropylene, optionally with one or more copolymerizable monomer selected from $C_2$–$C_{10}$ α-olefin or diolefin, said polymer having a melt flow rate (MFR) (ASTM D1238) of from 0.5 to 1000 and a crystallinity by differential scanning calorimetry of from 0 to 70%; B) from 0.1 to 50 wt % of at least one ethylene copolymer having a weight-average molecular weight ($M_w$) (GPC) of from 500 to 10,000, a molecular weight distribution (MWD) (GPC) of from greater than 1.5 to less than or equal to 3.5, and a comonomer content of from greater than or equal to 20 mol % to less than 70 mol %; and optionally, C) from 0 to 20 wt % of a thermoplastic polypropylene modifier compound other than that of B).

11 Claims, 3 Drawing Sheets

The Influence of Low Molecular Weight Polyethylene-co-butene on a-PP $T_{1pH}$ Relaxation

Fig. 7

PLASTICIZED POLYPROPYLENE THERMOPLASTICS

RELATED APPLICATIONS

This application is a Continuation of U.S. application Ser. No. 09/390,235, filed Sep. 3, 1999, now U.S. Pat. No. 6,639,020; and incorporates by reference the entire disclosure of Ser. No. 09/390,235.

FIELD OF INVENTION

This invention relates to hydrocarbon plasticizers for polypropylene thermoplastics.

BACKGROUND

The blending of plasticizers in general with thermoplastics and the resulting plasticization of those thermoplastics are well known and many reviews have been written. A plasticizer is generally an organic compound incorporated into a high polymer, such as for example a thermoplastic, to desirably facilitate processing, increase its workability, flexibility, and/or distensibility of the polymer.

Within the last few years efforts have been made in the field of plasticizers to better understand factors which govern plasticizer/thermoplastic miscibility. Examples of a thermoplastic and plasticizer include polypropylene and low molecular weight polyolefins, respectively. Polypropylene is an inexpensive polyolefin engineering thermoplastic that is generally stiff and even brittle below room temperature especially for highly stereoregular polypropylene. Tackifiers are examples of low molecular weight polyolefins plasticizers. Examples of tackifiers include hydrocarbon resins derived from fractionated petroleum distillates, coal tar, turpentine fractions and from copolymerization of pure aromatic monomers. However, these tackifiers typically have high glass transition temperature ($T_g$) and high solubility parameter. As such, upon blending, these tackifiers tend to raise the $T_g$ of the polypropylene. Increasing the $T_g$ increases the stiffness of polypropylene.

Other plasticizers, which have low $T_g$, (below −20° C.) such as ethylene-propylene rubber, ethylene-butene copolymer (having a $M_w$ greater than or equal to 20,000), are immiscible with the polypropylene. Plasticizers which are immiscible with polypropylene tend to collect on the surface of the manufactured article, hinder the manufacturing process of articles made therefrom and may cause the resulting product to have generally undesirable features.

Because polypropylene is an inexpensive thermoplastic, there exists a need to improve its workability and to overcome its inherent stiffness and brittleness which limit its commercial application. Therefore, a need exist to safely and economically improve the workability, flexibility, and/ or distensibility of polypropylene.

SUMMARY OF THE INVENTION

Miscible blends of polypropylene with low molecular weight ethylene α-olefin copolymer plasticizers have been discovered. By blending such miscible, low molecular weight ethylene α-olefin copolymer plasticizers with polypropylene (isotactic polypropylene, syndiotactic polypropylene and atactic polypropylene), the glass transition temperature, storage modulus and viscosity of the blended polypropylene are lowered. By decreasing the transition temperature, storage modulus and viscosity, the workability, flexibility, and distensibility of polypropylene improves. As such, broadened commercial application for these new polypropylene blends in film, fibers and molded products is apparent. Furthermore, the flexibility of a product design utilizing these novel blends can be further extended by taking advantage of the enhanced comonomer incorporation and tacticity control possible with metallocene catalysts, both of which can reduce isotactic polypropylene ("iPP") crystallinity prior to blending with the low molecular weight ethylene α-olefin copolymer plasticizers.

In one embodiment, a plasticized polypropylene thermoplastic is provided. The plasticized polypropylene thermoplastic includes from 50 to 99.9 weight percent ("wt %") of a thermoplastic polymer derived from polypropylene. Optionally, the thermoplastic polymer is copolymerizable with one or more monomers selected from $C_2$–$C_{10}$ α-olefin or diolefin. The thermoplastic polymer desirably has a melt flow rate (MFR) (ASTM D1238) in the range of from 0.3 to 1000 and a crystallinity, determined by differential scanning calorimetry (DSC) at a scan rate of 10° C. per minute, in the range of from 0 to 70% crystallinity. The thermoplastic polymer is blended with from 0.1 to 50 wt % of at least one ethylene copolymer. The ethylene copolymer desirably has a weight-average molecular weight ($M_w$) (GPC) of from 500 to 10,000, a molecular weight distribution (MWD) (GPC) of from greater than 1.5 to less than or equal to 3.5, and a comonomer content of from greater than or equal to 20 mol % to less than 70 mol %. The plasticized polypropylene thermoplastic may include from 0 to 20 wt % of the polypropylene thermoplastic composition, of a thermoplastic polypropylene modifier compound other than the ethylene copolymer described above. Examples of thermoplastic polypropylene modifier compounds include one or more compositions selected from the group which includes antioxidants, fillers, pigments, hydrocarbon resins, rosins or rosin esters, waxes, UV stabilizers, additional plasticizers, and tackifiers such as ESCOREZ, a product of Exxon Chemical, which is more fully described in U.S. Pat. No. 5,317,070 which is incorporated by reference herein. Additionally, the terminal vinylidene groups present on some of the above thermoplastic polypropylene modifier compounds may be functionalized, such functionalization being more fully described in U.S. Pat. Nos. 5,763,556 and 5,498,809, both of which are incorporated by reference herein.

The ethylene copolymer may be further described as having a glass transition temperature ($T_g$) of from greater than or equal to −80° C. to less than or equal to −30° C. In another embodiment, the ethylene copolymer may be described as having an ethylene crystallinity, as determined by differential scanning calorimetry (DSC) at a scan rate of 10° C. per minute of less than or equal to 5% crystallinity.

In another embodiment, the plasticized polypropylene thermoplastic may be further described as having a crystallinity by DSC at a scan rate of 10° C. per minute of less than 60% and wherein the wt % of said ethylene copolymer present in the plasticized polypropylene thermoplastic is less than or equal to y, wherein y is in the range of 0.1 to 50, as determined by y in the equation $$y=50-0.5x$$

where x=the % crystallinity of the thermoplastic polymer.

In another embodiment, the thermoplastic polymer may be further described as having a crystallinity by DSC at a scan rate of 10° C. per minute of greater than or equal to 60% and wherein the wt % of said ethylene copolymer present in the plasticized polypropylene thermoplastic can be as high as 20.

In another embodiment, the ethylene copolymer component may include, in addition to ethylene, one or more of $C_3$ to $C_{20}$ linear or branched α-olefin or diolefin. Desirably, the ethylene copolymer may be either an ethylene-propylene, ethylene-butene copolymer, ethylene-hexene copolymer, ethylene-octene copolymer, ethylene norbornene, ethylene styrene copolymers, and ethylene-isobutylene copolymers or mixed monomers including ter-, tetrapolymers, and the like, thereof.

In another embodiment, a plasticized polypropylene thermoplastic composition is provided which includes a blend of a thermoplastic polymer and the ethylene copolymer. The thermoplastic polymer is desirably derived from amorphous propylene. Desirably, from 50 to 99.9 wt % of the plasticized polypropylene thermoplastic is the thermoplastic polymer. Optionally the thermoplastic polymer may include one or more copolymerizable monomers selected from $C_2$–$C_{10}$ α-olefin or diolefin. The thermoplastic polymer has melt flow rate (MFR) (ASTM D1238) in a range from 0.3 to 1000 and a crystallinity, as determined by differential scanning calorimetry (DSC at a scan rate of 10° C. per minute), in a range from 0 to less than 5%. Desirably, from 0.1 to 50 wt % of the plasticized polypropylene thermoplastic is the ethylene copolymer. The ethylene copolymer has a weight-average molecular weight ($M_w$) (GPC) in a range from 500 to 10,000, a molecular weight distribution (MWD) (GPC) in a range from greater than 1.5 to less than or equal to 3.5, and a comonomer content in a range from greater than or equal to 20 mol % to less than 70 mol %. The plasticized polypropylene thermoplastic may also include from 0 to 20 wt % thereof of a thermoplastic polypropylene modifier compound other than the ethylene copolymer. Examples of this thermoplastic polypropylene modifier include, but are not limited to, antioxidants, fillers, pigments, hydrocarbon resins, rosins or rosin esters, waxes, UV stabilizers, additional plasticizers, singularly or in combination.

In another embodiment, the plasticized polypropylene thermoplastic may be further described as having a crystallinity by DSC at a scan rate of 10° C. per minute of less than 5% and wherein the wt % of said ethylene copolymer present in the plasticized polypropylene thermoplastic is less than or equal to y, wherein y is in the range of 0.1 to 50, as determined by y in the equation $$y=50-0.5x$$

where x=the % crystallinity of the thermoplastic polymer.

In another embodiment, a plasticized polypropylene thermoplastic composition is provided which includes a blend of a thermoplastic polymer and the ethylene copolymer wherein the wt % of the ethylene copolymer in the plasticized polypropylene thermoplastic is less than or equal to y, wherein y is in the range of 0.1 to 50, as determined by y in the equation $$y=50-0.5x$$

where x=the % crystallinity of said thermoplastic polymer. The thermoplastic polymer is derived from polypropylene, optionally with one or more copolymerizable monomer selected from $C_2$–$C_{10}$ α-olefin or diolefin, said thermoplastic polymer having a melt flow rate (MFR) (ASTM D1238) of from 0.3 to 1000. The ethylene copolymer has a weight-average molecular weight ($M_w$) (GPC) of from 500 to 10,000, a molecular weight distribution (MWD) (GPC) of from greater than 1.5 to less than or equal to 3.5, and a comonomer content of from greater than or equal to 20 mol % to less than 70 mol %. In one embodiment, from 50 to 99.9 wt % of the plasticized polypropylene thermoplastic is derived from the thermoplastic polymer and from 0.1 to 50 wt % of the plasticized polypropylene thermoplastic is derived from the ethylene copolymer. Desirably, the crystallinity, by differential scanning calorimetry (DSC at a scan rate of 10° C. per minute), of the thermoplastic polymer is in a range of from 0 to 70%.

In another embodiment, a plasticized polypropylene thermoplastic composition formed from a blend of a thermoplastic polymer and an ethylene copolymer is provided. The thermoplastic polymer derived from polypropylene, optionally with one or more copolymerizable monomer selected from $C_2$–$C_{10}$ α-olefin or diolefin, said thermoplastic polymer having a melt flow rate (MFR) (ASTM D1238) of from 0.3 to 1000. The ethylene copolymer has a weight-average molecular weight ($M_w$) (GPC) of from 500 to 10,000, a molecular weight distribution (MWD) (GPC) of from greater than 1.5 to less than or equal to 3.5, and a comonomer content of from greater than or equal to 20 mol % to less than 70 mol %. The wt % of the ethylene copolymer in the thermoplastic composition is less than or equal to y, wherein y is in the range of 0.1 to 50, as determined by y in the equation $$y=50-0.5x$$

where x=the % crystallinity of said thermoplastic polymer.

DETAILED DESCRIPTION OF THE INVENTION

This invention relates to (1) plasticized polypropylene thermoplastic compositions, particularly miscible blends of polypropylene with low molecular weight ethylene α-olefin copolymer plasticizers; (2) methods for making plasticized polypropylene thermoplastic compositions; and (3) products made from plasticized polypropylene thermoplastic compositions. These are described in turn below.

As used herein, "isotactic" is defined as having at least 95% isotactic (meso) pentads according to analysis by $^{13}$C-NMR. As used herein, "highly isotactic" is defined as having at least 99% isotactic pentads according to analysis by $^{13}$C-NMR.

As used herein, "amorphous" is defined as having less than 5% crystallinity as measured by DSC at a scan rate of 10° C. per minute.

As used herein, "molecular weight" means weight average molecular weight ($M_w$) and "molecular weight distribution," (MWD), means $M_w$ divided by number average molecular weight ($M_n$) as determined by gel permeation chromatography (GPC). As used herein, unless otherwise stated, "polymerization" means homopolymerization.

The plasticized polypropylene thermoplastics described herein are a blend of a thermoplastic polymer and an ethylene copolymer. This blend may also include thermoplastic polypropylene modifiers. These modifiers may be included in the plasticized polypropylene thermoplastic compositions. Such modifiers (also known as additives) and their use are generally well known in the art.

Ethylene Copolymer Compositions

Generally, ethylene copolymers suitable for blending with the thermoplastic polymer, including amorphous and isotactic thermoplastic polymers, desirably have a weight-average molecular weight ($M_w$) (GPC) of from 500 to 10,000, a molecular weight distribution (MWD) (GPC) of from greater than 1.5 to less than or equal to 3.5, and a comonomer content of from greater than or equal to 20 mol % to less than 70 mol %. The wt % of at least one ethylene copolymer present in the plasticized polypropylene thermoplastic composition may be from 0.1 to 20 wt %, desirably from 1.0 to 15 wt % and more desirably from 1.0 to 10 wt %. Specific examples of ethylene copolymers include, but are not limited to, ethylene-propylene, ethylene-butene, ethylene-hexene, and ethylene-octene copolymers. Additionally, the ethylene copolymer desirably has a glass transition temperature ($T_g$) in the range from greater than or equal to −80° C. to less than or equal to −30° C., more desirably from −75° C. to −45° C., most desirably, from −70° C. to −45° C.

Table 1 illustrates the glass transition temperatures, measured by DSC at a scan rate of 10° C. per minute, molecular weights and comonomer concentration of three ethylene/butene copolymers.

DSC was measured on a TA Instruments model number 2910. Generally, DSC is a measure of the heat flow into or away from a sample polymer. The sample polymer is placed in one heating chamber, a reference material into a separate heating chamber. The sample and a reference material are heated at a predetermined rate until heat is emitted or consumed by the sample. The DSC circuitry is programmed to maintain the same temperature for both the reference and sample chambers. The current necessary to maintain a constant temperature between the sample and reference is recorded. This data provide a direct measure of the heat of transition of the sample.

TABLE 1

| Ethylene Copolymer (Liquid) | Mole % comonomer (butene) | $M_w$, GPC (PE std) | Tg (DSC, ° C.) |
|---|---|---|---|
| Copolymer 1 | 33.3 | 7550 | −71 (−45) [a] |
| Copolymer 2 | 60 | 8780 | −55.3 |
| Copolymer 3 | 66.7 | 6550 | −61.2 |

[a] Small second transition in DSC.

Table 1A illustrates the molecular weights and comonomer concentration of two ethylene/propylene copolymers.

TABLE 1A

| Ethylene Copolymer (Liquid) | Mole % comonomer (propylene) | $M_w$, GPC (PE std) | Tg (DSC, ° C.) |
|---|---|---|---|
| Copolymer 4 | 38 | 21,900 | Not Measured |
| Copolymer 5 | 42 | 3400 | −76.0(−52) [a] |

[a] Small second transition in DSC.

Copolymers 1–5 may be made in a high pressure reactor. An example of such a high pressure reactor would be a staged and baffled reactor (5 zones) and have a reactor volume 750 liters, and a 6:1 length/diameter dimension. The residence time in such a reactor may be between 1–2 minutes.

More particularly, the polymerization conditions for copolymers 1–5 would include a stirred 750 liter steel autoclave reaction vessel which is equipped to perform continuous Ziegler-Natta (Z-N), metallocene or other single site catalyst polymerization reactions at pressures up to 2500 bar and temperature up to 300° C. The reactor system may be equipped with instrumentation, such as thermocouples and pressure transducers to continuously monitor temperature and pressure and continuous feed systems to continuously supply purified compressed monomers (e.g., ethylene, butene-1). Additional equipment may also include a continuous catalyst feed system, a rapid venting and quenching system, and a product separation and collection system. The polymerization may be performed without the addition of any external solvents. The reactor contents may be stirred continuously during polymerization. A typical stirring rate may be about 2,000 rpm. The temperature in the reactor may be established and maintained at a target level, such as between 100° C. and 220° C. by pumping the catalyst solution using a continuous high pressure injection pump. See for example, U.S. Pat. Nos. 5,084,534 and 5,408,017 incorporated by reference for purposes of U.S. patent practice.

Following polymerization, the polymerized product may be separated and analyzed, for such purposes as quality control and the like. The unreacted ingredients may be transported via a recycle loop through a cooler and compressor and returned back to the autoclave reactor, along with fresh monomer. As will be recognized by those skilled in the art of high pressure Z-N polymerization, the process allows considerable flexibility to modify the molecular weights and copolymer composition, among other parameters of the polymerized products.

More specific reactor conditions may include the use of $Me_2Si(H_4\text{-Indenyl})_2 ZrCl_2$ as the catalyst and methyl alumoxane (MAO) as the co-catalyst. The Al/transition metal molar ratio may range from 50:1 to 500:1. Reactor pressure may be 20,000 psi or approximately 1350 bar. The reactor exit temperature may be in the range of between 300° F. to 370° F., depending upon the target molecular weight. The composition feed may be 90 mole % butene-1 and 10 mole % ethylene to achieve a target 50 wt. % incorporation of butene-1 into the ethylene copolymer. Under these conditions, a production rate of around 2750 lbs/hr. may be achieved.

The viscosity measurements for copolymers 1, 3–5 are provided in Table 2. In keeping with the GPC molecular weight measurements, the viscosity of Copolymer 1 is higher than that of Copolymer 2. These viscosities were measured using a Brookfield Viscometer.

TABLE 2

| Liquid | Viscosity (cP @ ° C.) | | | |
|---|---|---|---|---|
| | 50 | 60 | 70 | 90 |
| Copolymer 5 | 1255 | 715 | 485 | |
| | 1200 | 695 | 445 | 200 |
| | 50 | 70 | 90 | 110 |
| Copolymer 1 | 8810 | 2850 | 1230 | |
| | | 2910 | 1250 | 580 |
| Copolymer 3 | 6010 | 1880 | 730 | |
| | | 1840 | 750 | 360 |
| | | 110 | 120 | 140 |
| Copolymer 4 | | 54,500 | 39,800 | 22,800 |

Figure 1:
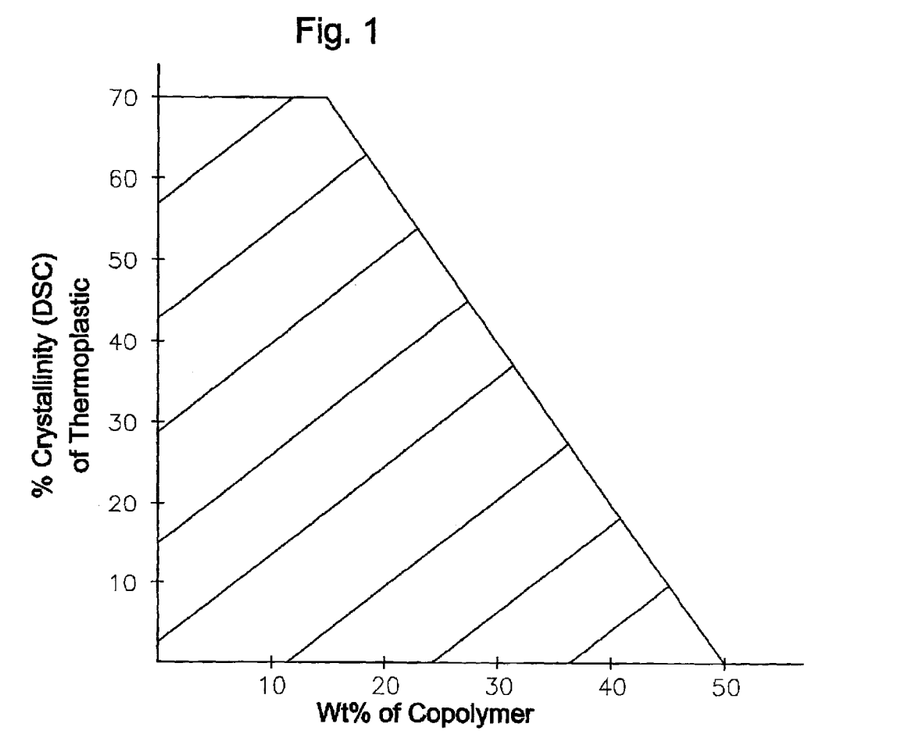
FIG. 1 illustrates the relationship between the wt % copolymer present in the plasticized polypropylene thermoplastic and % crystallinity of the plasticized polypropylene thermoplastic.

The wt % of the ethylene copolymer present in the plasticized polypropylene thermoplastic may be described by Equation 1, wherein the wt % of the copolymer is less than or equal to y, wherein y is in the range of 0.1 to 50, as determined by y in Equation 1:

$$y = 50 - 0.5x$$

where x=the % crystallinity of the thermoplastic polymer composition (described in greater detail below). The relationship between wt % copolymer present in the plasticized polypropylene thermoplastic and % crystallinity is further illustrated in FIG. 1.

Thermoplastic Polymer Compositions

Generally, thermoplastic polymers suitable for use in this invention may be derived from propylene or may be copolymerized with small amounts, generally from 0.1 to 10 mol. % of one or more monomers selected from $C_2$–$C_{10}$ α-olefins or diolefins such as for example, ethylene, butene-1, hexene-1 and octene-1. These thermoplastic polymers include copolymers and homopolymers and blends, including reactor blends, of amorphous polypropylene, isotactic polypropylene, and metallocene catalyzed polypropylenes. These thermoplastic polymers may have a molecular weight distribution that is in the range of from about 2.0 to about 20.0, desirably from about 2.0 to about 12.0, even more desirably from about 2.0 to about 8.0.

The thermoplastic polymers compositions of this invention may have a weight average molecular weight ($M_w$) that is in the range of from about 60,000 to about 750,000, and desirably from about 100,000 to about 500,000, and most desirably from about 150,000 to about 400,000. These thermoplastic polymer compositions may have a melt flow rate (MFR) that is in the range of from about 0.2 dg/min to about 30 dg/min, desirably from about 0.5 dg/min to about 20.0 dg/min, even more desirably from about 1.0 dg/min to about 10.0 dg/min. The melting point of the thermoplastic polymer may be less than about 162° C., desirably less than about 155° C., and most desirably less than about 150° C. Upper limits for melting point depend on the specific application but would typically not be higher than 170° C. The hexane extractables level (as measured by 21 CFR 177.1520(d)(3)(i)) of the these thermoplastic polymers may be less than 2.0 wt %, and desirably less than 1.0 wt %.

The thermoplastic polymers of this invention can be blended with other polymers, particularly with other polyolefins. Specific examples of thermoplastic polymers include, but are not limited to ethylene-propylene rubber, ethylene-propylene diene rubber, and ethylene plastomers. Specific examples of commercially available ethylene plastomers include EXACT™ resins products of Exxon Chemical Company and, AFFINITY™ resins and ENGAGE™ resins, products of Dow Chemical Company.

Thermoplastic Polypropylene Modifier

Thermoplastic polypropylene modifiers may be those commonly employed with plastics. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, hydrocarbon resins, rosins or rosin esters, waxes, additional plasticizers and other additives in conventional amounts. Effective levels are known in the art and depend on the details of the base polymers, the fabrication mode and the end application. In addition, hydrogenated and/or petroleum hydrocarbon resins and other plasticizers may be used as modifiers.

The plasticized polypropylene thermoplastic composition may include from 0 to 20 wt % of a thermoplastic polypropylene modifier compound other than the ethylene copolymer. Desirably, the thermoplastic polypropylene modifier constitutes greater than 0.001 wt % of the plasticized polypropylene thermoplastic composition.

Metallocene Catalyzed Thermoplastic Polymers

The preparation of metallocene catalyzed thermoplastics and particularly metallocene catalyzed polypropylene involves the use of metallocene catalyst systems. Metallocene catalyst systems include a metallocene component and at least one activator. Desirably, these catalyst system components are supported on support materials, such as inorganic oxide or polymeric materials.

Metallocenes

As used herein "metallocene" and "metallocene component" refer generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Methods for preparing metallocenes are fully described in the *Journal of Organometallic Chem.*, volume 288, (1985), pages 63–67, and in EP-A-320762, both of which are herein fully incorporated by reference.

Desirable metallocene catalyst components are described in detail in U.S. Pat. Nos. 5,145,819; 5,243,001; 5,239,022; 5,329,033; 5,296,434; 5,276,208; 5,672,668; 5,304,614; 5,374,752; 5,240,217; and 5,643,847; and EP 549 900 and 576 970 all of which are herein fully incorporated by reference.

Additionally, metallocenes such as those described in U.S. Pat. No. 5,510,502 (incorporated herein by reference) are suitable for use in this invention.

Activators

Metallocenes are generally used in combination with some form of activator. Alkylalumoxanes are desirably used as activators, most desirably methylalumoxane (MAO). There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO94/10180, each fully incorporated herein by reference. Activators will also include those comprising or capable of forming non-coordinating anions along with catalytically active metallocene cations. Compounds or complexes of fluoro aryl-substituted boron and aluminum are particularly suitable, see, e.g., U.S. Pat. Nos. 5,198,401; 5,278,119; and 5,643,847.

Support Materials

The catalyst systems used in the process of this invention may optionally be supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

The supported catalyst system may be used directly in polymerization or the catalyst system may be prepolymerized using methods well known in the art. For details regarding prepolymerization, see U.S. Pat. Nos. 4,923,833; 4,921,825; and 5,643,847; and EP 279 863 and EP 354 893 (each fully incorporated herein by reference).

Incorporation of the Thermoplastic Polymer with the Ethylene Copolymer

The plasticized polypropylene thermoplastics may be formed by blending the thermoplastic polymer with the ethylene copolymer. For small quantities sufficient for laboratory examination and analysis, a mixer, such as a Brabender mixer, will be sufficient. For larger or commercial quantities, the liquid ethylene copolymer may be pumped directly into an extruder zone containing the melted thermoplastic polymer.

The plasticized polypropylene thermoplastics of this invention are compositions that can be effectively used in many if not all of the uses known for polypropylene compositions. These uses include, but are not limited to: hot melt adhesives; pressure sensitive adhesives (as an adhesive component, particularly when the polypropylene has low levels of crystallinity, e.g., amorphous polypropylene); films (whether extrusion coatings, cast or blown; such will exhibit improved heat sealing characteristics); sheets (such as by extrusion in single or multilayer sheets where at least one layer is a plasticized polypropylene thermoplastic composition of the invention); any of meltblown or spunbond fibers; and, as thermoplastic components in thermoformable thermoplastic olefin ("TPO") and thermoplastic elastomer ("TPE") blends where polypropylene has traditionally been demonstrated to be effective. In view of these many uses, with improved low temperature properties and increased workability, the plasticized polypropylene thermoplastics offer a suitable replacement in selected applications for plasticized polyvinyl chloride (PVC).

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

EXAMPLES

Example 1

The glass transition temperatures measured by dynamic mechanical thermal analysis ("DMTA"—tan δ peak) for blends of plasticizer liquids and elastomeric polypropylene (ePP) and amorphous polypropylene (aPP) are listed in Table 3.

DMTA measurements were determined by placing approximately 0.8 grams of the sample in a Rheometrics 25 mm vacuum mold. A plunger is inserted into the mold, using a 1" spacer to hold the plunger above the vacuum port. This assembly is placed in a Carver press. The sample chamber is evacuated for at least 5 min. at ambient temperature and then heated to 190° C. and held at that temperature for 10 min. while still under vacuum. After this period, the press heater is turned off, the spacer removed, and 5,000 lbs. of pressure applied while a nitrogen purge is passed through the mold cooling port. Once the sample has cooled to room temperature, the plunger is pushed out of the mold using a press and the plunger removal tool. Cooling to lower temperature may be required for samples that cannot easily be removed from mold faces.

Using a 13 mm wide bar cutter, the sample is cut to size (1 to 2 mm×13 mm×20 mm) for DMTA test just prior to use. The Polymer Labs DMTA is calibrated for the A, B and C transducer stiffness settings. L frame and C sample clamps are used for mounting the sample. The test parameters include a single cantilever; peak to peak displacement of 64 microns (less for stiffer samples), frequency of 1 or 10 Hz, start temperature of −140° C., max temperature of 150° C. Temperature is increased at a rate of 3° C./min.

Tan δ is the ratio of E"/E' where E" is the loss modulus and E' is the elastic modulus or storage modulus.

These measurements clearly show a pronounced depression in the $T_g$ of the polypropylene from ~273–276° K. Also shown in Table 3 are calculated $T_g$'s based on equation (2).

$$1/T_g = w_1/T_{g1} + w_2/T_{g2}$$

where $w_1$ is the weight fraction of component 1, $T_{g1}$ is the glass transition temperature of component 1, $w_2$ is the weight fraction of component 2, and $T_{g2}$ is the glass transition temperature of component 2.

TABLE 3

Comparison of Measured (DMTA) and Calculated Tg of Plasticized Amorphous Polypropylenes

| Blend | | Tg Measured | Tg Calc [d] |
|---|---|---|---|
| a-PP (wt %) | Copolymer (wt %) | (° K) | (° K) |
| e-PP [a] (60) | Copolymer 2 (40) | 256 | 249 |
| a-PP(50) [b] | Copolymer6 [c] (50) | 258 | — |
| a-PP(50) | Copolymer 2 (50) | 245 | 243 |

TABLE 3-continued

Comparison of Measured (DMTA) and Calculated
Tg of Plasticized Amorphous Polypropylenes

| Blend | | Tg Measured | Tg Calc [d] |
|---|---|---|---|
| a-PP (wt %) | Copolymer (wt %) | (° K) | (° K) |
| a-PP(50) | Copolymer 3 (50) | 249 | 238 |
| a-PP(50) | Copolymer 1 (50) | 242 | 233 |

[a] Molecular weight characterization of this polymer (GPC-VIS): MN = 15k; MW = 302.5k; MZ = 762.6k, and crystallinity (~5% based on DSC). Prepared in accordance with the G.W. Coates and R. M. Waymouth paper appearing in "Science", vol. 267, p. 217 (1995) incorporated by reference herein.
[b] Amorphous polypropylene polymerized at 90° C. for 40 min. using a mono(cyclopentadienyl)Ti(4+) catalyst activated with MAO (constant Al/Ti ratio) in hexane. This amorphous polypropylene contained between 4.9 and 6.3% 2,1 defect insertions by no 1,3 insertions and ~60% racemic triads and ~40% meso triads. GPC-VIS data MW ~274.1k; MWD = 2.3. The polymerization process is described in greater detail in U.S. Pat. No. 5,420,217 which is incorporated by reference herein.
[c] high molecular weight ($M_w$ = 274,000) ethylene octadecene ("OD") copolymer; 30 mole % OD
[d] Polypropylene Tg used in calculation eq(2) is 273° K.

Example 2

Density results for two blends of aPP (described in Example 1) with copolymers 1 and 2 are compared with the density of the unblended aPP are reported in Table 4. Density was measured using a density gradient column (ASTM D-792).

TABLE 4

Density Comparison (23° C.):
aPP versus Examples of Plasticized aPP

| Copolymer | Copolymer Liquid, wt % | Density, g/cm3 @ 23° C. |
|---|---|---|
| None | 0 | 0.8525 |
| Copolymer 1 | 50 | 0.8591 |
| Copolymer 2 | 50 | 0.8592 |

The density measured for the unblended aPP is comparable to those reported for amorphous polypropylene in the literature. The increased density (0.007 g/cm) of the blends relative to the unblended aPP indicates a substantial reduction in "void volume". This reduction in void volume is suggestive of miscibility of the blends.

Example 3

Figure 2:
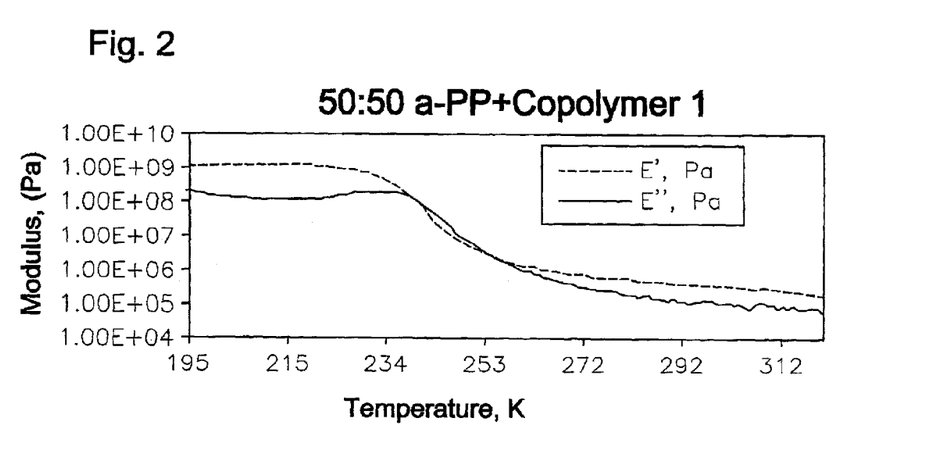
FIG. 2 illustrates dynamic mechanical thermal analysis measurements of a 50:50 blend of atactic polypropylene and Copolymer 1 (an ethylene-butene copolymer, see Table 1).
Figure 3:
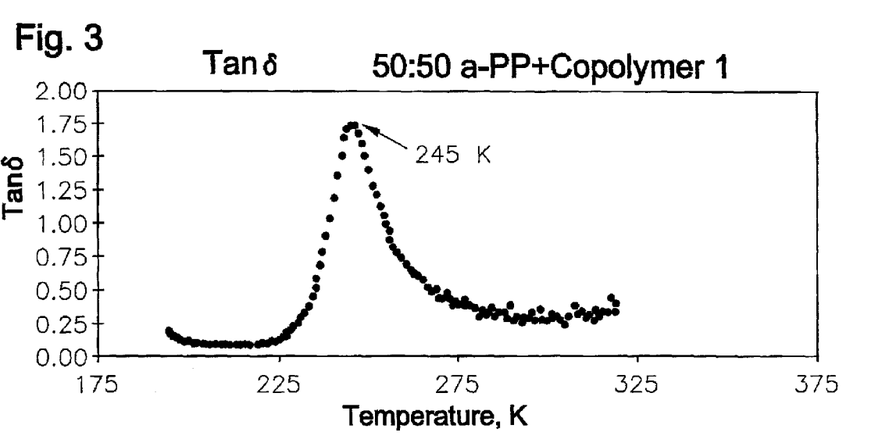
FIG. 3 illustrates a tan δ peak for the blend in FIG. 2.

Dynamic mechanical thermal analysis of the 50:50 blend of aPP (Example 1)+Copolymer 1 was measure, and the results illustrated in FIG. 2. The peak in tan δ occurs at 245° K and is illustrated in FIG. 3. This value is in good agreement with the Tg measured for this blend by DSC at a scan rate of 10° C. per minute (242° K). DMTA of this same aPP without plasticizer gives a peak at 276° K.

DMTA's were measured (not illustrated) for two other blends: ePP (Example 1)+Copolymer 3 and aPP (Example 1)+Copolymer 3. The Tg's measured from DMTA and DSC for these three blends are compared in Table 5. Agreement between the two methods is good.

TABLE 5

Comparison of Tg Measured by DSC and DMTA

| Blend | | Tg, °K | |
|---|---|---|---|
| Thermoplastic Polymer (wt %) | Copolymer (wt %) | DSC | DMTA |
| e-PP [a] (60) | Copolymer 2 (40) | 256 | 258 |
| a-PP [a] (50) | Copolymer 2 (50) | 245 | 247 |
| a-PP [a] (50) | Copolymer 1 (50) | 242 | 245 |

[a] The thermoplastic polymers described in Example 1.

In all three blend DMTA's, the tan δ peak was substantially broader than that for the pure aPP, and markedly skewed to higher temperature as well.

Figure 4:
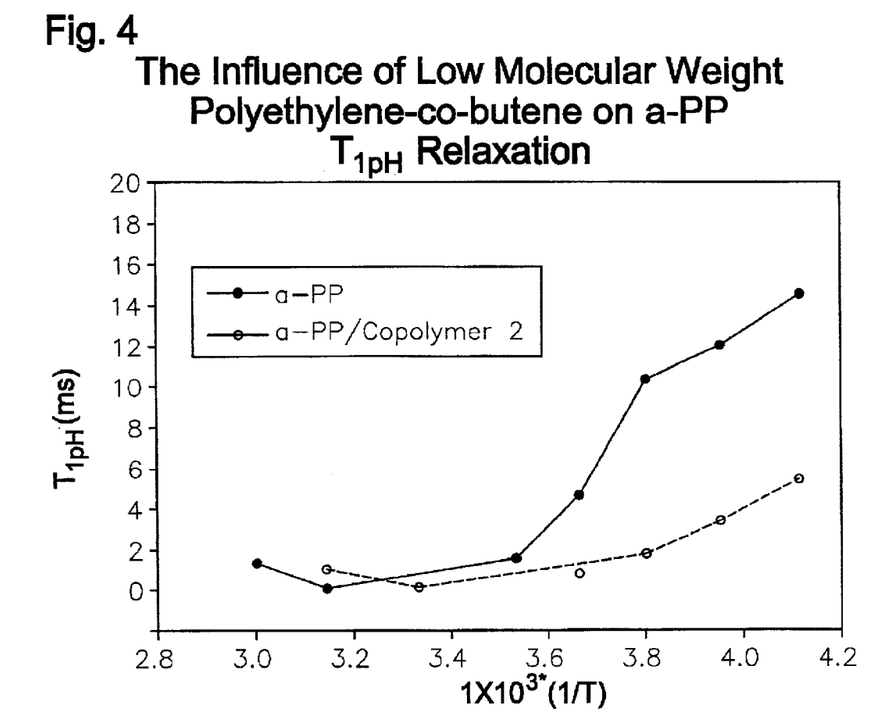
FIG. 4 illustrates NMR relaxation measurements ($T_{1\rho H}$) for a blend of atactic polypropylene and Copolymer 2 (an ethylene-butene copolymer, see Table 1).

FIG. 4 illustrates NMR relaxation measurements ($T_{1\rho H}$) for the blend of aPP and Copolymer 2

Procedure:

The NMR data were obtained on a Bruker DSX-500 spectrometer using a variable-temperature 4-mm MAS probe. Radio-frequency power levels were 70 kHz for spin-locking and decoupling, corresponding to a H π/2 pulse of 3.5 microseconds. Data were collected at MAS speeds of 4.5–5 kHz. Depending on the temperature, anywhere from 100 to 2,000 scans were collected per relaxation time increments. $T_{1\rho H}$ measurements were made using standard $^{13}$C cross-polarization observations experiments, in which the length of the H spin-lock pulse was incrementally varied prior to cross-polarization. The blend was prepared in toluene solutions containing a BHT stabilizer, and dried under nitrogen at ambient temperature, with further drying at 50° C. in vacuum for 48 hours.

NMR relaxation measurements also demonstrate miscibility between aPP and Copolymer 2 (50:50 wt:wt).

Example 4

Storage modulus depression data were measured by DMTA as described in Example 1.

Storage modulus depression can be achieved through manipulation of crystallinity of the polypropylene as well as addition of plasticizer. The plateau storage modulus of reactor grade aPP (Example 1) at ambient temperature is 0.47 Mpa, or just above 2×10 −6 dynes/cm (the "Dahlquist Criterion") for adhesion. Addition of low molecular weight ethylene copolymer plasticizer can depress the storage modulus at least another decade or so, or well below the Dahlquist Criterion, thus rendering the polymers exceptionally tacky. A new family of adhesives could be made based on these blends where first the crystallinity of the polypropylene is adjusted appropriately with a combination of tacticity defects and comonomer then miscible liquid added to adjust and optimize the balance of properties. Optionally, miscible tackifiers may also be used. Even with a melting point of 125° C.—corresponding to a crystallinity of just ~15% and total defects of ~9–10 mole %—one would have a wide Tm–Tg use window on the order of 130–140° C.

Example 5

A summary of ambient temperature properties measured on tensile bars made from a blend of isotactic polypropylene (PD-4062 resin) and Copolymer 2 is provided in Table 6. PD-4062 resin is a polypropylene homopolymer available from Exxon Chemical. PD-4062 resin has a melt flow rate of 3.9 g/10 min (ASTM D 1238) and a density of 0.90 g/cm³ (ASTM D 792).

Tensile Measurement Procedure

Approximately 3 grams of sample is placed in a 2.5"× 2.5"×6 mil mold template between two pieces of Teflon foil. This assembly is placed between the 6"×6" platens of a Carver Press and heated to 190° C. for 2 min. At this point the sample is compressed at 5,000 psi and 190° C. for an additional 2 min. The mold is then removed, placed on cooling platens, and cooled to room temperature.

After the sample is removed from the mold, it is inspected for bubbles and imperfections. Tensile specimens are cut from areas having no visible imperfections using a standard micro "bog bone" cutter (5.5–6 mil thickness, 0.08" in width and 0.197 in length). Five samples were cut from each compression molded plaque. The samples were allowed to age at least 48 hours before tensile measurements were carried out.

Each tensile specimen was tested on the Instron 4502 using serrated grips set at 80 psi. The sample rate was 10 points per second at a crosshead speed of 2"/min.

TABLE 6

Summary of Tensile Bar Data Recorded at Ambient Temperature for Blends of Copolymer 2 with isotactic polypropylene (PD4062)

| Wt % Copolymer 2 | Modulus (kpsi) | Stress @ Yield (kpsi) | % Strain @ Max Load | Energy-to-Break (lbs-in) |
|---|---|---|---|---|
| 6 | 50.3 | 4.77 | 845 | 2.75 |
| 12.5 | 40.5 | 4.1 | 822 | 3.18 |
| 18 | 33.2 | 3.52 | 690 | 2.24 |

Example 6

A summary of ambient temperature properties measured on tensile bars made from a blend of isotactic polypropylene and Copolymer 3 is provided in Table 7.

TABLE 7

Summary of Tensile Bar Data Recorded at Ambient Temperature for Blends of Copolymer 3 with isotactic polypropylene (PD4062)

| Wt % Copolymer 3 | Modulus (kpsi) | Stress @ Yield (kpsi) | % Strain-to-Break | Energy-to-Break (lbs-in) |
|---|---|---|---|---|
| 0 | 55.0 | 5.68 | 503 | 2.29 |
| 10 | 41.6 | 4.32 | 871 | 3.62 |
| 20 | 30.0 | 3.28 | 848 | 2.52 |

Example 7

Figure 5:
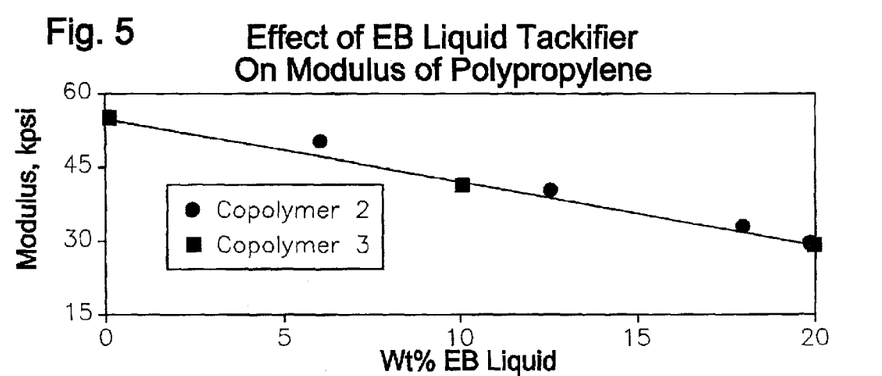
FIG. 5 illustrates the decreasing effect on Young's modulus of isotactic polypropylene by blending Copolymers 1–3 therewith (Copolymer 3 is an ethylene-butene copolymer, see Table 1).
Figure 6:
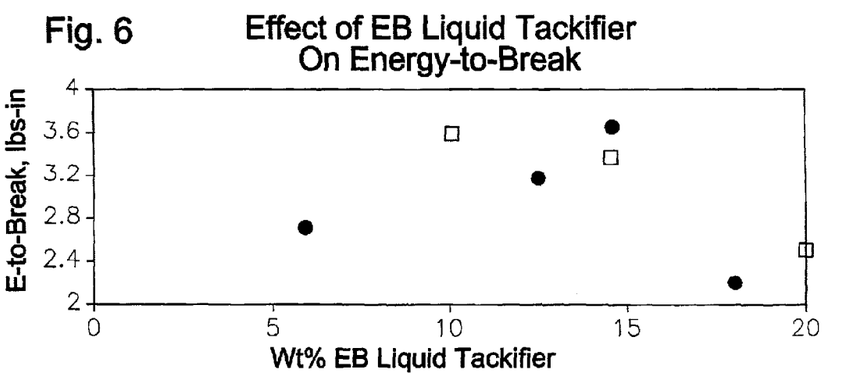
FIG. 6 illustrates that energy-to-break for the tensile bars increases over 50% due to addition of ~5–15 wt % plasticizer.

FIG. 5 illustrates the roughly linearly decreasing effect on Young's modulus of isotatic polypropylene by blending Copolymers 2 and 3 with isotactic polypropylene (PD4062). In keeping with the data shown in FIG. 4 (DMTA data), the Young's modulus obtained from the tensile bars decreases— roughly linearly—with increasing plasticizer content. In addition, the energy-to-break for the tensile bars increases over 50% due to addition of ~5–15 wt % plasticizer (maximum around 10 wt %) as illustrated in FIG. 6).

Example 8

Figure 7:
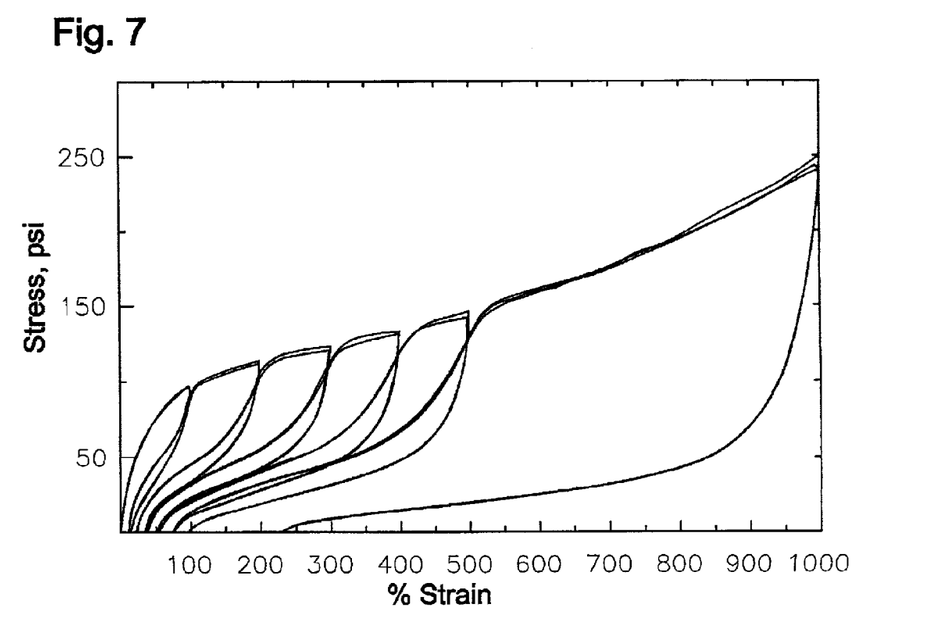
FIG. 7 illustrates a hysterisis series of tensile curves for 60:40 wt:wt blend of elastomeric polypropylene and Copolymer 2.

An examination of the large strain behavior/recovery of a very soft [ePP (described in Example 1)+Copolymer 2] 60:40 wt:wt blend was undertaken. A hysterisis series of tensile curves (A J Peacock procedure) is shown in FIG. 7. Elastic recovery of this material is ~90% 24 hours after 1000% elongation. Elongation to break is ~1400%.

Hysterisis Test Procedure

The hysterisis tests were conducted on the Instron 1123D. The film hysteresis testing procedure used is an Exxon variation of a procedure described by DuPont in its brochure on its polyether urethane elastic product, T-722a. In the Exxon variation, 1×6 inch strips are subjected to successive % strains of 100, 200, 300, 400, 500 and 1,000% (jaw gap separation of 2" and crosshead speed of 20"/min). The sample is held for 30 seconds at extension and then retracted and held at 60 seconds a relaxation prior to the next extension cycle. FIG. 8 illustrates the hysteresis stress/strain curve.

Tables 8, 9 and 10 provide mechanical properties data for several polypropylene liquid blends and comparative data for non-blended polypropylene. The mechanical data were generated using various tests that are listed in the first column of each Table. The procedures for conducting each such test are known and understood by one skilled in the art.

TABLE 8

|  | PD4062 | PD4062 10% EB8D | PD4062 20% EB8D | Escorene 3445 | Escorene 3445 10% EB8D | Escorene 3445 20% EB8D | RCP PD9272 | RCP PD9272 10% EB P-42-27 |
|---|---|---|---|---|---|---|---|---|
| Gardner Impact RT (in-lbs) | 220. (B) (DB) | 249.8 (D) | 222.7 (D) | 109.3 (S) (DB) | 188.0 (D) (S) (DB) | 20.0 (DB) | 311.3 (D) | 230.9 (D) |
| Gardner Impact −29° C.(in-lbs) | <8 | <8 | <8 | <8 | <8 | <8 | <8 | <8 |
| Notched Impact RT (ft-lb/in) | 0.578 | 0.895 | 1.159 | 0.356 | 0.518 | 0.388 | 1.312 | 1.551 |

TABLE 8-continued

|  | PD4062 | PD4062 10% EB8D | PD4062 20% EB8D | Escorene 3445 | Escorene 3445 10% EB8D | Escorene 3445 20% EB8D | RCP PD9272 | RCP PD9272 10% EB P-42-27 |
|---|---|---|---|---|---|---|---|---|
| Notched Impact −18° C. (ft-lb/in) | 0.269 | 0.178 | 0.257 | 0.206 | 0.219 | 0.136 | 0.183 | 0.279 |
| Notched Impact −40° C. (ft-lb/in) | 0.181 | 0.215 | 0.189 | 0.206 | 0.156 | 0.144 | 0.153 | 0.199 |

TABLE 9

|  | PD4062 | PD4062 10% EB8D | PD4062 20% EB8D | Escorene 3445 | Escorene 3445 10% EB8D | Escorene 3445 20% EB8D | RCP | RCP 10% EB P-42-27 |
|---|---|---|---|---|---|---|---|---|
| 1% Secant Flex Mod (psi) | 220873 | 133105 | 90491 | 172196 | 116355 | 72976 | 106957 | 71152 |
| 1% tangent Flex Mod (psi) | 227616 | 140036 | 96440 | 175337 | 124411 | 78142 | 110312 | 74769 |
| Flex Strength (psi) | 2683 | 1575 | 1084 | 2070 | 1417 | 873 | 1290 | 859 |
| Energy at peak (in-lb) | 0.229 | 0.131 | 0.092 | 0.173 | 0.120 | 0.075 | 0.108 | 0.068 |

TABLE 10

|  | PD4062 | PD4062 10% EB8D | PD4062 20% EB8D | Escorene 3445 | Escorene 3445 10% EB8D | Escorene 3455 20% EB8D | RCP | RCP 10% EB P-42-27 |
|---|---|---|---|---|---|---|---|---|
| Yield Stress (psi) | 4922 | 3885 | 3045 | 4591 | 3569 | 2592 | 3316 | 2510 |
| Elongation at Yield (%) | 19.5 | 29.01 | 38.23 | 20.05 | 28.65 | 28.63 | 20.26 | 29.06 |
| Elongation at Break (%) | 349.79 | 998.02 | 998.84 | 357.08 | 558.36 | 55.53 | 998.40 | 998.21 |
| Stress at Break (psi) | 3164 | 3187 | 2998 | 1617 | 1490 | 2355 | 3067 | 2586 |
| Youngs Modulus (psi) | 85591 | 47669 | 26191 | 74097 | 43446 | 27465 | 44123 | 27310 |
| Energy @ Break (in-lb) | 1369 | 3506 | 3147 | 1162 | 1663 | 151 | 2878 | 2468 |

"B" means brittle,
"S" means strings
"DB" means ductile brittle and
"D" means ductile.
PD4062 is a polypropylene homopolymer described in Example 5
Escorene 3445 is a polypropylene homopolymer available from Exxon Chemical. MFR 35 g/10 min (ASTM D1238) Density 0.90 g/cm$^3$ (ASTM D792)
RCP PD9272 is a polypropylene/ethylene random copolymer available from Exxon Chemical. MFR 2.9 g/10 min (ASTM D1238) Density 0.89 g/cm$^3$ (ASTM D792)
EB8D is a an ethylene(24 wt %) propylene (76 wt %) copolymer, 4000 Mn.
P42-27 is an ethylene (51 wt %) butene (49 wt %) copolymer, 5184 Mn.

While the present invention has been described and illustrated by reference to particular embodiments, those of ordinary skill in the art will appreciate that the invention lends itself to many different variations not illustrated herein. For these reasons, then, reference should be made solely to the appended claims for purpose of determining the true scope of the present invention.

Although the appendant claims have single appendencies in accordance with U.S. patent practice, each of the features in any of the appendant claims can be combined with each of the features of other appendant claims of the independent claim.

I claim:
1. A plasticized polypropylene thermoplastic composition comprising a blend of:
  a) from 50 to 99.9 wt % of a thermoplastic polymer derived from polypropylene, optionally with one or more copolymerizable monomer selected from $C_2$–$C_{10}$ α-olefin or diolefin, said polymer having a melt flow rate (MFR) (ASTM D1233) of from 0.3 to 1000 and a crystallinity by differential scanning calorimetry of from 0 to 70%;
  b) from 0.1 to 50 wt % of a least one ethylene copolymer having a weight-average molecular weight ($M_w$) (GPC)

of from 500 to 10,000, a molecular weight distribution (MWD) (GPC) of from greater than 1.5 to less than or equal to 3.5, and a from 20 to 70 mole % of one or more comonomers selected from the group consisting of $C_3$ to $C_{20}$ linear or branched alpha-olefins or diolefins.

2. The polypropylene thermoplastic composition of claim 1 wherein said ethylene copolymer comprising from 20 to 70 mole % of one or more comonomers selected from the group consisting of $C_8$ and $C_{10}$ linear or branched alpha-olefins or diolefins.

3. The polypropylene thermoplastic composition of claim 1 wherein said ethylene copolymer comprising from 20 to 70 mole % of one or more comonomers selected from the group consisting of $C_8$ linear or branched alpha-olefins or diolefins.

4. The polypropylene thermoplastic composition of claim 1 wherein said ethylene copolymer comprising 20 to 70 mole % of one or more comonomers selected from the group consisting of $C_{10}$ linear or branched alpha-olefins or diolefins.

5. The polypropylene thermoplastic composition of claim 1 wherein said ethylene copolymer comprises 20 to 70 mole % of one or more comonomers selected from the group consisting of $C_8$ and $C_{10}$ linear alpha-olefins.

6. The polypropylene thermoplastic composition of claim 1 wherein said ethylene copolymer comprises 20 to 70 mole % of $C_{10}$ linear alpha-olefins.

7. The polypropylene thermoplastic composition of claim 1 wherein said ethylene copolymer comprises 20 to 70 mole % of $C_8$ linear alpha-olefins.

8. The polypropylene thermoplastic composition of claim 1 where the ethylene copolymer has a glass transition temperature ($T_g$) of from greater than or equal to −80° C. to less than or equal to −30° C.

9. The polypropylene thermoplastic composition of claim 1 wherein said thermoplastic polymer A) has a crystallinity by DSC at a scan rate of 10° C. per minute of less than 60% and the wt % of said ethylene copolymer is less than or equal to y, wherein y is in the range of 0.1 to 50, as determined by y in the equation $$y = 50 - 0.5x$$

where x=the % crystallinity of said thermoplastic polymer A).

10. The polypropylene thermoplastic composition of claim 1 wherein said thermoplastic polymer A) has a crystallinity by DSC at a scan rate of 10° C. per minute of greater than or equal to 60% and the wt % of said ethylene copolymer is 20.

11. The polypropylene thermoplastic composition of claim 1 further comprising greater than 0.001 wt % of the total blend of one or more modifiers selected from the group consisting of antioxidants, fillers, pigments, hydrocarbon resins, rosins or rosin esters, waxes, UV stabilizers, and additional plasticizers.

* * * * *